UNITED STATES PATENT OFFICE.

DARWIN P. FLINN, OF GENEVA, NEW YORK, ASSIGNOR TO WM. S. MILLER, OF NEW YORK CITY.

IMPROVED PAINT COMPOUND.

Specification forming part of Letters Patent No. 50,068, dated September 19, 1865.

*To all whom it may concern:*

Be it known that I, DARWIN P. FLINN, of Geneva, in the county of Ontario and State of New York, have invented a new and Improved Paint; and I do hereby declare that the following is a full, clear, and exact statement of the component parts of and the manner of compounding and using the same.

The component parts are as follows: white oxide of zinc, seventy-two (72) pounds; fresh slaked lime, twelve (12) pounds; resin, three (3) pounds; milk, thirty-six (36) quarts; linseed-oil, six (6) quarts, or similar proportions in larger or smaller quantities.

The several ingredients are compounded in the following manner. The lime is slaked by pouring on it just sufficient water, a little at a time. When the lime is cool one-third of the quantity of milk is added to and stirred till a perfect mixture is effected. The resin is added to the oil and dissolved by warming the latter to a suitable degree and stirring it. While the oil and resin are warm they are added, a little at a time, to the lime and milk and stirred till mixed therewith. The oxide of zinc and the remainder of the milk are then added, and the stirring is continued till the mixture of the whole is effected, and the mixture is then ground in an ordinary paint-mill and put up for sale in the same manner as other paints.

When the paint is to be used it is thinned with skimmed milk to the required consistency for spreading easily with the brush. It dries in about two hours, and is very hard and durable for inside work, and keeps its color better than ordinary oil-paint.

This paint is of a white color, but the color may be varied by adding a suitable quantity of any known pigment.

I do not confine myself to the use of the precise proportions herein specified of the several ingredients, as these proportions may be to some extent varied without changing the character of the paint; but

What I claim as my invention, and desire to secure by Letters Patent, is—

A paint composed of oxide of zinc, lime, resin, linseed-oil, and milk, in about the proportions herein specified.

DARWIN P. FLINN.

Witnesses:
GEORGE SHAVER,
HENRY T. BROWN.